Jan. 10, 1928.
A. G. STUEDEMAN
DISAPPEARING DOG
Filed June 27, 1923
1,655,580
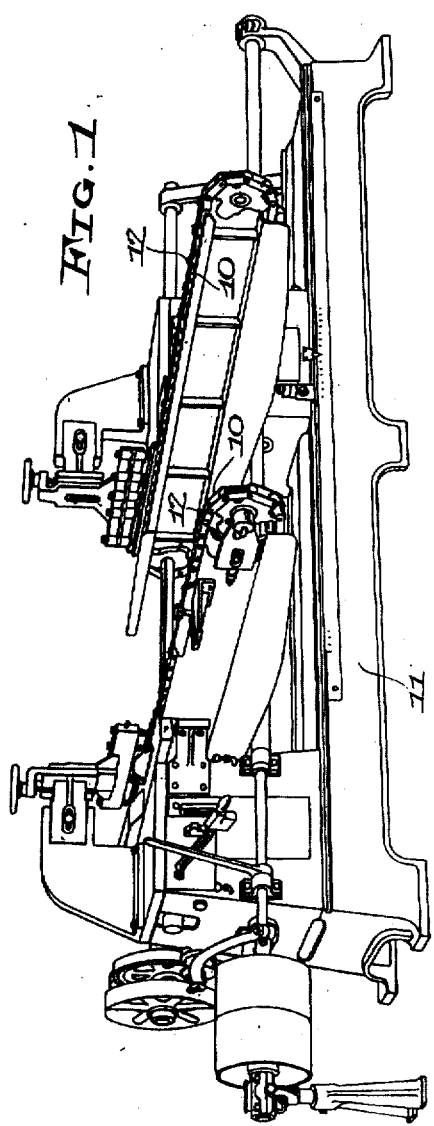
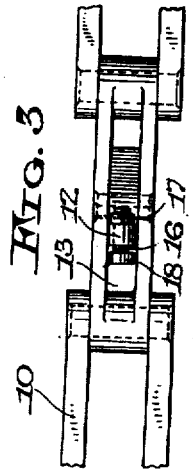
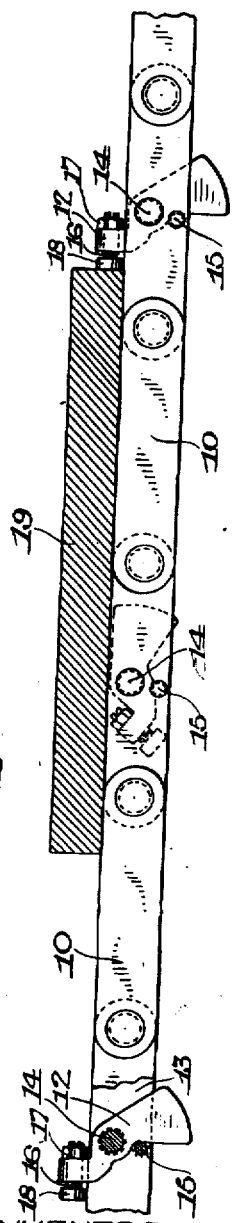
WITNESSES
INVENTOR
Anton G. Stuedeman
By R. S. Caldwell
ATTORNEY Patented Jan. 10, 1928.

1,655,580

UNITED STATES PATENT OFFICE.

ANTON G. STUEDEMAN, OF SHEBOYGAN, WISCONSIN, ASSIGNOR TO JENKINS MACHINE COMPANY, OF SHEBOYGAN, WISCONSIN, A CORPORATION OF WISCONSIN.

DISAPPEARING DOG.

Application filed June 27, 1923. Serial No. 648,103.

This invention relates to disappearing dogs for feed chains of double end tenoners and double cut-off saws and the like and has for its object to provide a dog which will serve the usual purpose of dogs in squaring the work to be operated upon and forcibly feeding it in that condition to the cutting tool or tools, but which will also yield when the work is placed upon it and move out of the way of the work so as to make it unnecessary to remove dogs when work wider than the spacing of the dogs is used.

With machines of this character the dogs of the separate feed chains are adjusted with respect to each other so that the work when bearing thereagainst will be squared with relation to the line of feed and the cutting operation performed thereon will be squared with relation to the edges of the work and when the dogs are spaced for using narrow work they are positioned as closely together as possible in order that the machine may work to full capacity. Then when wider work is used it is customary to remove some of the dogs to permit the work to lie flat on the guides, which operation results in a loss of time, and an even greater loss of time results from the necessity for replacing the dogs and readjusting them when the machine is again to be used for narrow work.

The disappearing dogs of the present invention are designed to avoid the necessity for removing them as they are capable of yielding to accommodate wider work and retain their adjustments so that they are ready at any time to receive the narrow work, even permitting broad and narrow work to be passed through the machine at the same time.

With the above and other objects in view the invention consists in the disappearing dog as herein claimed and all equivalents.

Referring to the accompanying drawing, in which like characters of reference indicate the same parts in different views.

Fig. 1 is a perspective view of a gear driven double cut-off saw provided with the disappearing dogs of this invention;

Fig. 2 is an elevation of one of the feed chains with parts sectioned and showing the dogs in operative and inoperative positions, and Fig. 3 is a plan view of one of the dogs.

In these drawings, 10 indicates the usual feed chains for the woodworking machine, in this instance a gear driven double cut-off saw 11, which chains are run parallel at uniform speed and are provided with dogs squared with respect to the direction of feed so that the work engaged thereby will be fed to the cutting tools in such squared relation and the work performed will be correspondingly squared. These dogs consist of dog members 12 which are pivotally mounted in slots 13 of the block members of the chains 10 by pivotally fitting upon pins 14 passed laterally through said block members and preferably countersunk and riveted therein. The heavier lower end of the dog member causes it to swing upright and bear against a stop pin 15 also passed laterally through said block member and preferably countersunk and riveted therein. In the upstanding end of the dog is threaded an adjusting screw 16 with a set nut 17 thereon to clamp it in its adjustments and on the end of the set screw is the usual head 18 for abutting against the rear edge of the work 19 as the means for forcing the work along the guides and presser bars and against the cutting tools.

In operation the dogs, which may conveniently be placed in all of the blocks of the chains, are so closely spaced as to accommodate the narrowest strips for which the machine is intended so as to enable the machine to be fed to its greatest capacity. When wider work is used it depresses such dogs as it lies upon, causing the dogs to swing to the position shown by dotted lines in Fig. 2, where they are entirely out of the way of the work. As soon as the work is removed the dogs return to their upright positions by the influence of their heavier lower ends and the engagement with the stop pins 15 is again effected, which means that the dogs are effective for again operating under their predetermined adjustment for squaring the work.

Under the old arrangement with fixed dogs spaced at seven and three-quarter inch centers, if the operator desires to cut stock twenty-four inches wide, it is necessary to remove two dogs in order to make space for the twenty-four inch stock, whereas with the disappearing dog of the present invention no removal of dogs is necessary and seven inch stock or thirty inch stock may be run at the same time.

By extending the heads of the dogs well in advance of their pivots, work placed directly thereon will press the dogs entirely out of the plane of the work-supporting face of the chains so that no obstruction interferes with the work lying flat on the chains or on other guides provided therefor at the level of the chains and the dogs beyond the work will come into engagement with it and feed it through the machine.

What I claim as new and desire to secure by Letters Patent is:

1. In a pair of parallel feed chains for woodworking machines, a feed chain, dogs pivotally mounted thereon to yield when work is placed thereon, and adjusting screws mounted on the dogs for engaging the work and adjustable to true the work.

2. In a chain feed for woodworking machines, a pair of parallel feed chains having their block members provided with openings therethrough, dog members pivotally mounted in said openings with their lower ends forming weights for holding them upright, stop pins extending across the openings and engaged by the dogs, adjusting screws threaded through the upper ends of the dogs, and heads on the adjusting screws for engaging the work and adjustable for truing the work.

In testimony whereof I affix my signature.

ANTON G. STUEDEMAN.

removal of dogs is necessary and seven inch stock or thirty inch stock may be run at the same time.

By extending the heads of the dogs well in advance of their pivots, work placed directly thereon will press the dogs entirely out of the plane of the work-supporting face of the chains so that no obstruction interferes with the work lying flat on the chains or on other guides provided therefor at the level of the chains and the dogs beyond the work will come into engagement with it and feed it through the machine.

What I claim as new and desire to secure by Letters Patent is:

1. In a pair of parallel feed chains for woodworking machines, a feed chain, dogs pivotally mounted thereon to yield when work is placed thereon, and adjusting screws mounted on the dogs for engaging the work and adjustable to true the work.

2. In a chain feed for woodworking machines, a pair of parallel feed chains having their block members provided with openings therethrough, dog members pivotally mounted in said openings with their lower ends forming weights for holding them upright, stop pins extending across the openings and engaged by the dogs, adjusting screws threaded through the upper ends of the dogs, and heads on the adjusting screws for engaging the work and adjustable for truing the work.

In testimony whereof I affix my signature.

ANTON G. STUEDEMAN.

CERTIFICATE OF CORRECTION.

Patent No. 1,655,580.      Granted January 10, 1928, to

ANTON G. STUEDEMAN.

It is hereby certified that error appears in the printed specification of the above numbered patent requiring correction as follows: Page 2, lines 16 and 17, claim 7, strike out the words "In a pair of parallel feed chains for woodworking machines, a feed chain" and insert instead "In a chain feed for woodworking machines, a pair of parallel feed chains"; and that the said Letters Patent should be read with this correction therein that the same may conform to the record of the case in the Patent Office.

Signed and sealed this 21st day of February, A. D. 1928.

Seal.

M. J. Moore,
Acting Commissioner of Patents.

CERTIFICATE OF CORRECTION.

Patent No. 1,655,580.  Granted January 10, 1928, to

ANTON G. STUEDEMAN.

It is hereby certified that error appears in the printed specification of the above numbered patent requiring correction as follows: Page 2, lines 16 and 17, claim 7, strike out the words "In a pair of parallel feed chains for woodworking machines, a feed chain" and insert instead "In a chain feed for woodworking machines, a pair of parallel feed chains"; and that the said Letters Patent should be read with this correction therein that the same may conform to the record of the case in the Patent Office.

Signed and sealed this 21st day of February, A. D. 1928.

Seal.

M. J. Moore,
Acting Commissioner of Patents.